(12) United States Patent
Choate

(10) Patent No.: US 6,779,630 B2
(45) Date of Patent: Aug. 24, 2004

(54) REBAR STANCHION HORIZONTAL LIFELINE FALL ARREST SYSTEM

(76) Inventor: Gary E. Choate, 1675 Carr St., #101N, Lakewood, CO (US) 80215

(*) Notice: Subject to any disclaimer, the term of this patent is extended or adjusted under 35 U.S.C. 154(b) by 0 days.

(21) Appl. No.: 09/974,205

(22) Filed: Oct. 9, 2001

(65) Prior Publication Data

US 2002/0079164 A1 Jun. 27, 2002

Related U.S. Application Data

(60) Provisional application No. 60/239,387, filed on Oct. 10, 2000, now abandoned.

(51) Int. Cl.[7] .............................................. A62B 35/00
(52) U.S. Cl. ........................................... 182/36; 182/3
(58) Field of Search ............................ 182/3, 112, 113, 182/36, 45, 4; 52/DIG. 12; 256/59, 71, 65, 67, DIG. 5, DIG. 6, 53

(56) References Cited

U.S. PATENT DOCUMENTS

| | | | | |
|---|---|---|---|---|
| 3,880,405 A | * | 4/1975 | Brueshe | 256/59 |
| 3,901,470 A | * | 8/1975 | Roeder | 248/188.4 |
| 4,015,827 A | * | 4/1977 | Brand | 256/59 |
| 4,037,824 A | * | 7/1977 | Whitmer | 256/53 |
| 5,029,670 A | * | 7/1991 | Whitmer | 182/113 |
| 5,301,480 A | * | 4/1994 | Oyama et al. | 52/126.6 |
| 5,307,897 A | * | 5/1994 | Turner et al. | 182/3 |
| 5,358,068 A | * | 10/1994 | Whitmer | 182/113 |
| 5,522,472 A | * | 6/1996 | Shuman, Jr. et al. | 182/3 |
| 5,718,305 A | * | 2/1998 | Palmer | 182/45 |
| 5,842,685 A | * | 12/1998 | Purvis et al. | 256/67 |
| 5,850,889 A | * | 12/1998 | Rexroad et al. | 182/3 |
| 5,863,020 A | | 1/1999 | Olson et al. | |
| 5,971,668 A | * | 10/1999 | Miller | 182/3 |
| 6,173,809 B1 | * | 1/2001 | Cole et al. | 182/3 |

* cited by examiner

Primary Examiner—Daniel P. Stodola
Assistant Examiner—Hugh B. Thompson
(74) Attorney, Agent, or Firm—Ramon L. Pizarro

(57) ABSTRACT

A horizontal lifeline support system for use with a rebar stub or stud extending from a building structure. The system includes a stanchion having an elongated body, the body having a top end and a bottom end, the bottom end having an aperture therein, the aperture being adapted for accepting the rebar stud or stub on the building structure, and at least one guy member, the guy member having a pair of opposite ends, one of the ends of the guy member being connected to the top end of the stanchion and the opposite end having a clamp attaching the second end of the guy member to the building structure.

2 Claims, 12 Drawing Sheets

REBAR STANCHION HORIZONTAL LIFELINE FALL ARREST SYSTEM

REFERENCE TO RELATED APPLICATIONS:

This application claims the benefit of my provisional application having Ser. No. 60/239,387, filed Oct. 10, 2000, now abandoned.

BACKGROUND OF THE INVENTION (a) Field of the Invention

The present invention relates to a method for establishing anchorage stanchions for horizontal lifelines to be supported from rebar extending from the tops of poured in place concrete columns. Additionally this invention relates to a method for clamping, to various sized rebar, the tie back cables used to anchor the stanchions. Still further, this invention relates to a method for the rigging of horizontal lifeline rebar stanchion assemblies that will allow the lifelines to be arranged in a square grid for overall access to the area that the horizontal lifelines circumscribe. Additionally this patent relates to a method to terminate horizontal lifeline cable ends and improve ease of line length adjustment and pre-tensioning.

(b) Discussion of Known Art

Stanchion systems are currently used in many applications for horizontal lifeline anchorages. These systems typically bolt or weld to I-beams or other clamped structures. When stanchions must be erected on concrete floors or columns the large flat areas do not provide surfaces that can be readily attached to. Some users have tried inserting concrete anchor bolts into drilled holes for this purpose but found that the loads required often exceed the maximum capacity of the concrete anchor bolts. Only attachment to something deeply inset into the concrete would provide the necessary strength. Thus, the embedded rebar became the obvious choice for anchorage attachment.

The United States Occupational Safety and Health Administration (OSHA) requires that horizontal lifeline systems be rigged so that freefall cannot exceed 6 ft. When working on a deck or any elevation in which no overhead anchorage locations exist tying off at ones feet with a 6 ft. lanyard would create a 12 ft. freefall. The use of stanchions that tie back into the deck or column structure enable overhead anchorage points or lines to be established. So long as the elevation of the stanchion is at least the same elevation as that of the dorsal D-ring of the workers harness, the freefall will be limited to 6 ft. This present invention relates to a method for erecting a stanchion over a rebar and then tying the top of the stanchion back to other rebar in the same column using a rebar clamp that increases its clamping force as the force that is applied to it increases. This stanchion can also be configured to use twin heads that allow lifelines to be run at right angles to each other from the same stanchion. With this configuration one can create a grid around a floor opening over which workers must travel to install metal decking or pour forms for construction. This allows for many workers to be working in one area at the same time. Existing methods to rig lifelines to rebar include anchorage straps around tied rebar columns or cable loops around tied rebar columns. These generally are of insufficient strength and rigidity to carry the loads since the rebar has very little stiffness in the direction of load. These methods also do not allow pre-tensioning of lifeline cable to reduce input energy. At best, exiting methods to solve the problem of horizontal lifeline installations attached to rebar columns are inadequate if not dangerous.

An example of a lifeline support that includes a stanchion can be found in U.S. Pat. No. 5,863,020, to Olson et al., incorporated herein by reference.

SUMMARY

It has been discovered that the problems left unanswered by known art can be solved by mounting stanchions on building structure, such as concrete structure or concrete columns and elevated surfaces by supporting these stanchions on rebar stubs that are found protruding form the columns, or on studs fastened into the structure. These stanchions may be of varying heights but should be above 42 inches and preferably above 60 inches with some as high as 84 inches above the walking working surface. The stanchions may be constructed of steel, aluminum, composite fiber material or other generally rigid material, and may be round or square. An important example discussed herein is made of steel tube approximately 2.5 inches in diameter and 66 inches long with a load ring weld 6 inches down from the top of the stanchion tube. The rebar stanchions may be used in pairs to support each end of a lifeline or in quad groups to create a group of four lifelines that attach to each other in a square formation. Some stanchions may be used as end anchorages and some may be used as bypass stanchions. In another aspect this invention relates to an improved method for installing, adjusting and tensioning steel cable horizontal lifelines to improve efficiency and reduce overall installation cost, through the use of inline cable clamps to terminate the cable ends and synthetic webbing line tensioners to provide take up and pre-tensioning of the line to shorten apparent horizontal lifeline line length.

The method includes the steps of:

Providing a stanchion with an aperture that allows the stanchion to be placed over rebar stubs or studs that project from the structure;

Providing guy members and tieback clamps that can be used to anchor the stanchion to the structure; and Tensioning the guy members to stabilize the stanchion over the rebar or stud.

Another aspect this invention relates to the method of attaching a horizontal lifeline between the rebar anchorage stanchions. In most cases the installation of horizontal lifelines is a time consuming process because the lifeline lengths must be accurately measured and constructed to control horizontal lifeline sag which determines line load amplification, the present invention provides a new method for lifeline installation which greatly reduces the time required. Typical lifelines use eyes with cable clamps, open wedge sockets, or combination clamps to terminate horizontal lifeline cable. The installation of these items creates tight bends in the horizontal lifeline cable, which leaves kinks in the cable when removed. The present invention uses an inline cable clamp, which is a flat plate-in which the helical lay of the cable has been machined. When the cable is clamped between 2 flat inline cable clamp plates, the cable is terminated without bending or kinking the cable. This may be installed quickly and it allows the cable to be moved to other applications requiring different lengths without the annoyance of having kinks or bends in the horizontal lifeline cable.

In another aspect the invention relates to an improved method for adjusting the length of a horizontal lifeline cable during installation. Most cables used in horizontal lifeline applications are adjusted for length using turnbuckles or rigging screws. These typically have take up lengths of 6 to 12 inches requiring a cable length to be accurately measured and constructed prior to installation. This is a very time consuming process although acceptable for permanently installed systems. When systems used in concrete construction must be moved rapidly as in the case of the rebar stanchion systems, a new method has been developed. This method uses nylon or polyester or other high strength synthetic fiber sling webbing reeved through anchor strap load binders to provide take-up and pre-tensioning of the horizontal lifeline. The sling webbing is typically 2 inches or 3 inches in width and typically from 15,000 lb. to 30,000 lb. in breaking strength. In its preferred embodiment this load binder anchor strap assembly allows up to 10 ft. of rapid take up in the horizontal lifeline cable allowing for much quicker horizontal lifeline cable installation. The load binders also have sufficient torque to allow the horizontal lifeline cable to be pre-tensioned from 300 lbs. to 1500 lbs. of pre-tension.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
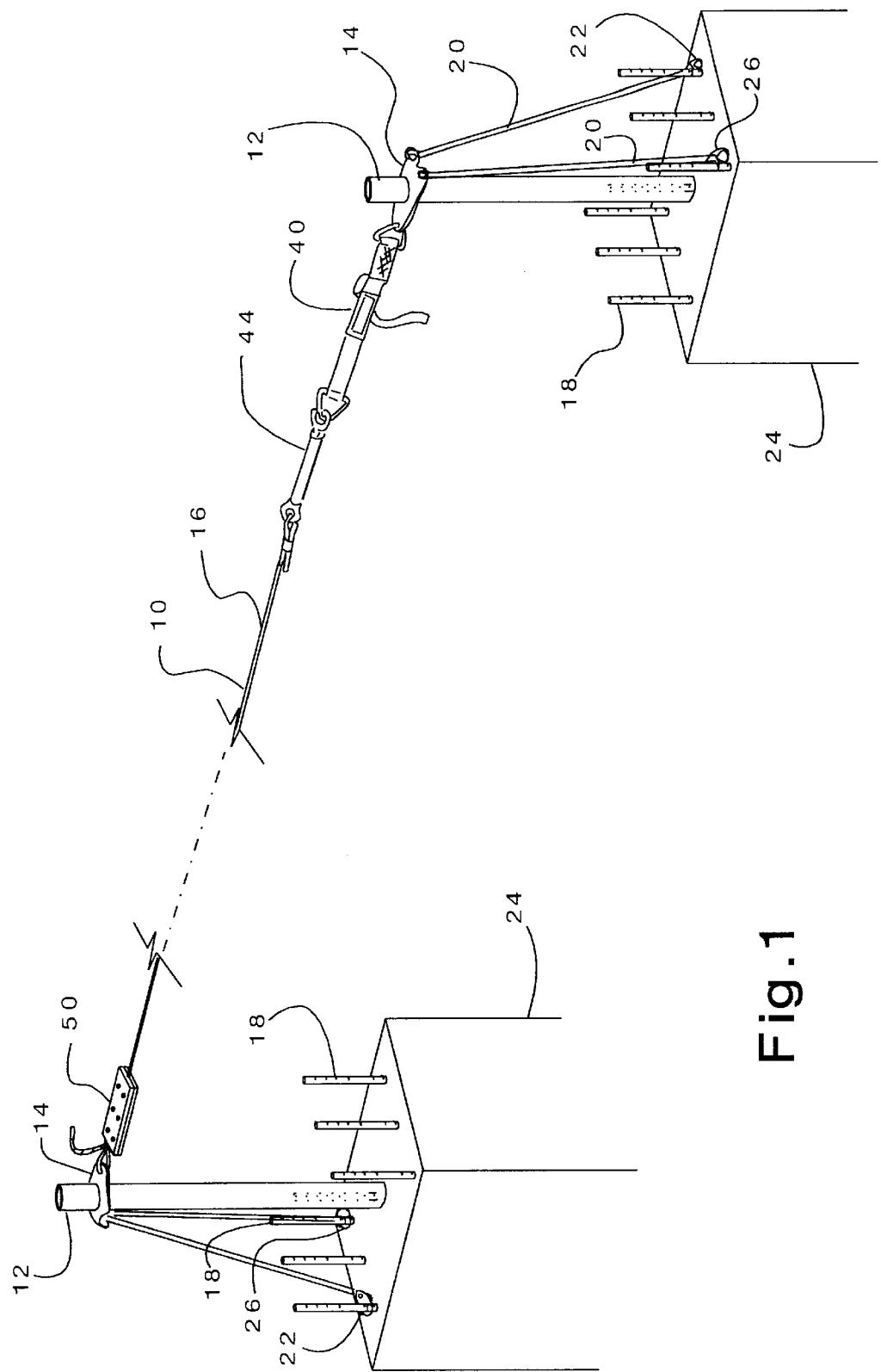
FIG. 1 is an isometric view of the rebar stanchion assembly.
Figure 2:
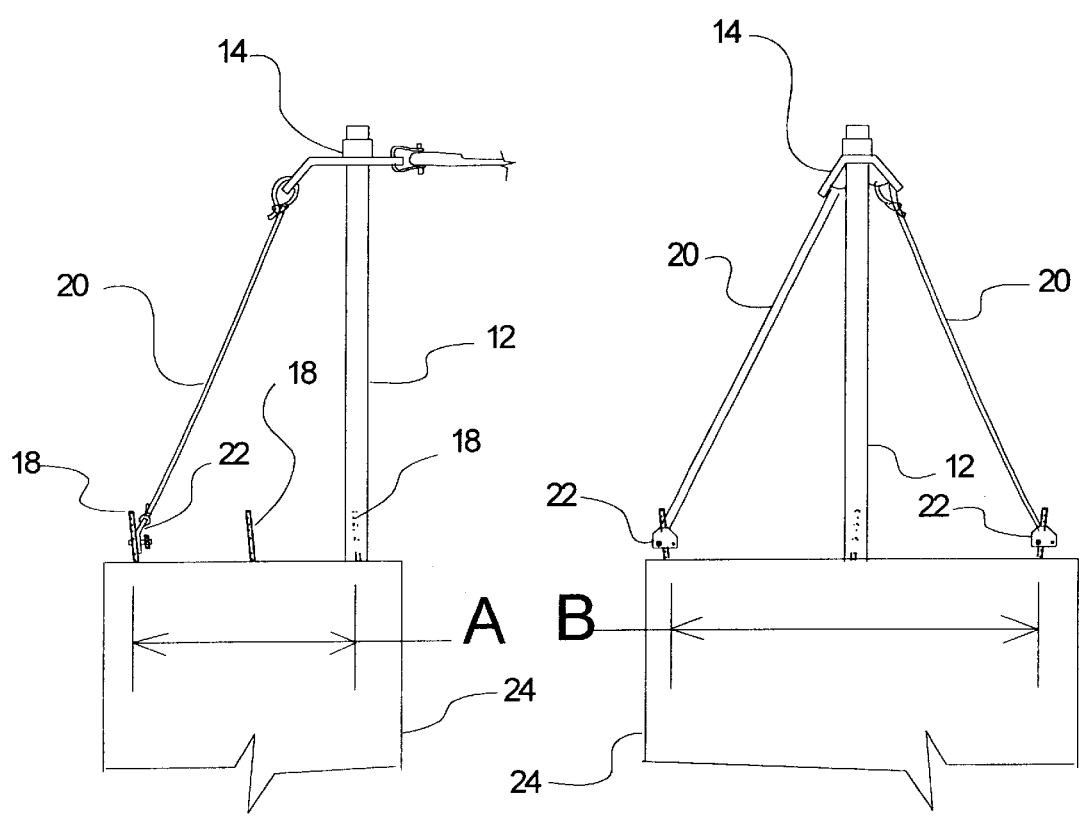
FIG. 2 is a rebar stanchion detail.

Turning now to FIGS. 1 through 6 where a rebar stanchion horizontal lifeline fall arrest system has been illustrated. In FIG. 1 the horizontal lifeline system 10 is shown attached to rebar stanchions 12 as would be used in normal installation. The rebar stanchion head 14 slips over the top of the rebar stanchion [<b>old12. The horizontal lifeline cable assembly 16 goes between the stanchion heads 14 at each end of the horizontal lifeline system. The rebar stanchion heads 12 are tied back to the rebar 18 using tie back cables 20 or guy members. The tie back cables 20 are connected to the rebar stanchion heads 14 at the top end and the rebar clamps 22 at the bottom end. Referring to FIG. 2 the spacing of the tie back cables 20 to the rebar stanchion 12 and the rebar 18 is shown. Offsets A and B FIG. 2 must be maintained to stabilize the rebar stanchion 12 and reduce load amplification in the tie back cables 20 that will be created due to the horizontal lifeline cable 16 tension during fall arrest. The high line tension in the tie back cables 20 must be absorbed by the Rebar 18 in the concrete columns or decking 24. Other bolting arrangements might also be used for tie back anchorage by bolting into the sides of the columns to put the bolts in shear, since few concrete anchor bolts are of sufficient strength to absorb the tie back cable 20 line tensions.

Figure 3:
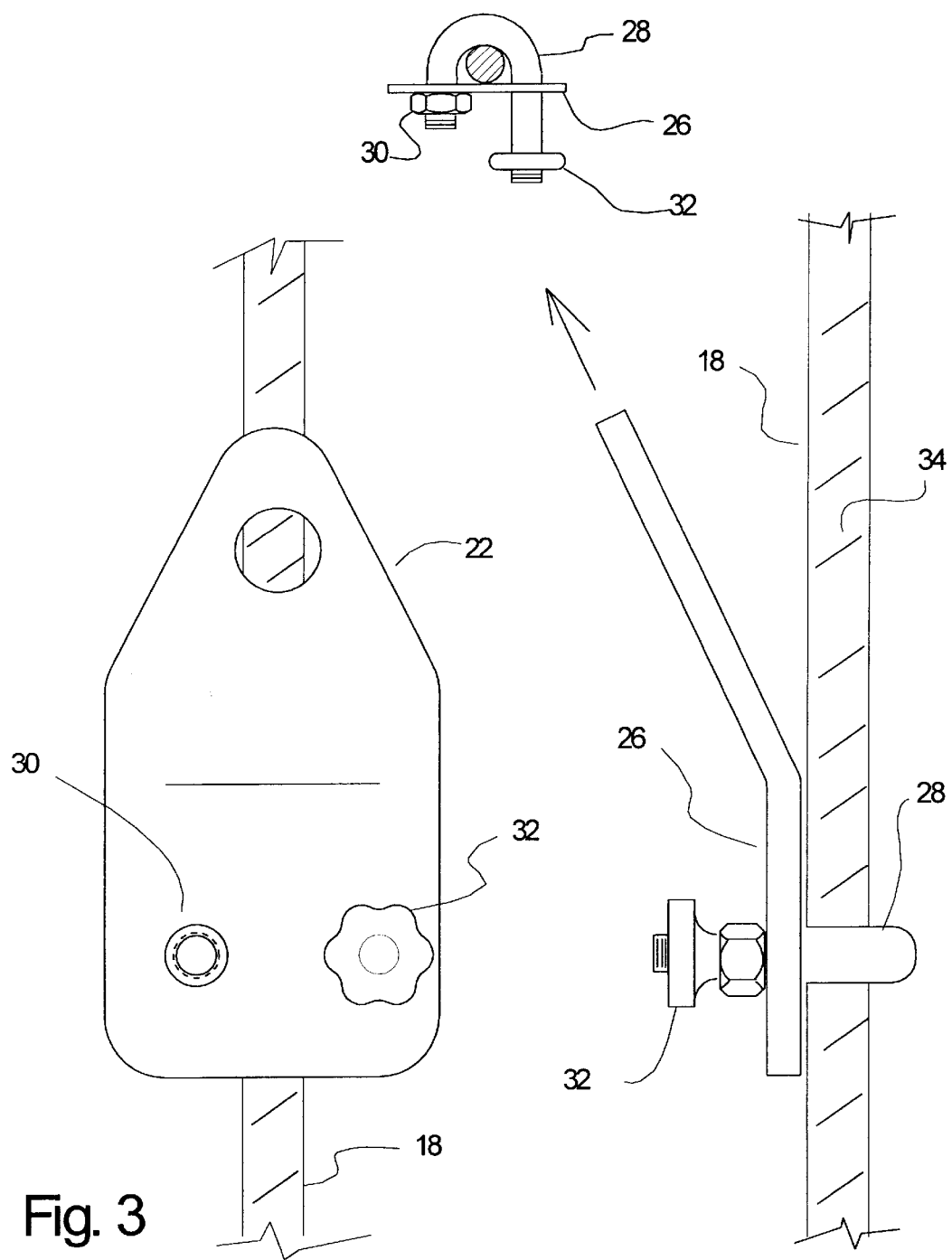
FIG. 3 is a rebar clamp detail.

FIG. 3 shows a preferred embodiment of the rebar clamp 22. The rebar clamp assembly 22 uses a tie plate 26 through which a U Bolt 28 is assembled. One side of the U Bolt 28 uses an adjusting nut 30 which is finger tightened to adjust the U Bolt 28 to the proper size of rebar 18. Once the adjusting nut 30 is correctly adjusted to fit the rebar 18 then the tightening knob 32 is tightened to provide clamping force to the rebar 18. As a load is applied to the rebar clamp assembly 22 due to line tension in the tie back cables 20 the clamp plate 26 will slide up the rebar 18. Since the U-bolt 28 is contained by the ribs in the rebar 18, the U-bolt 28 angle must change which pulls the clamp plate 26 ever 20 line tension increases.

Figure 4:
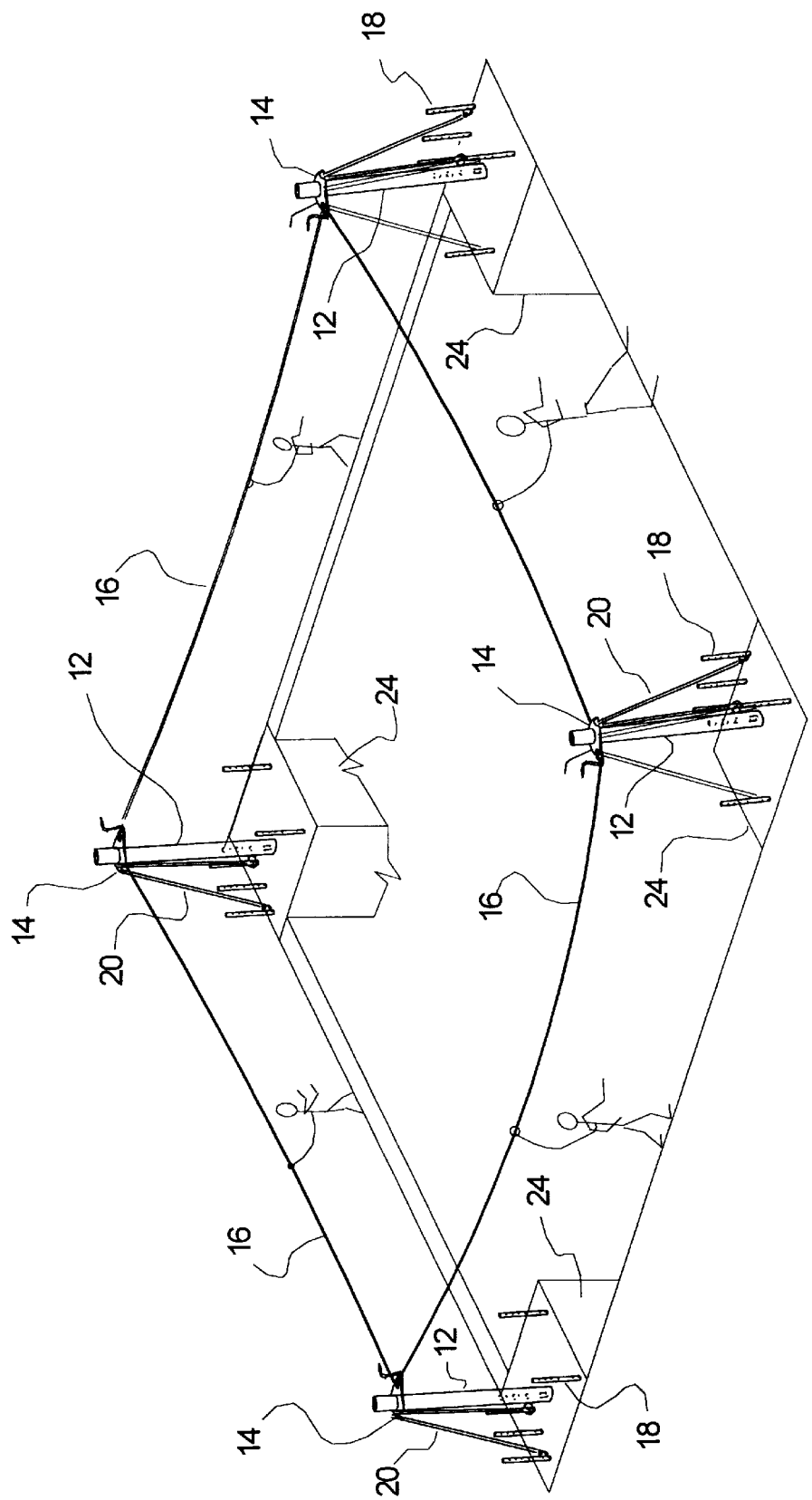
FIG. 4 is a quad arrangement detail of the rebar stanchion assembly.
Figure 5:
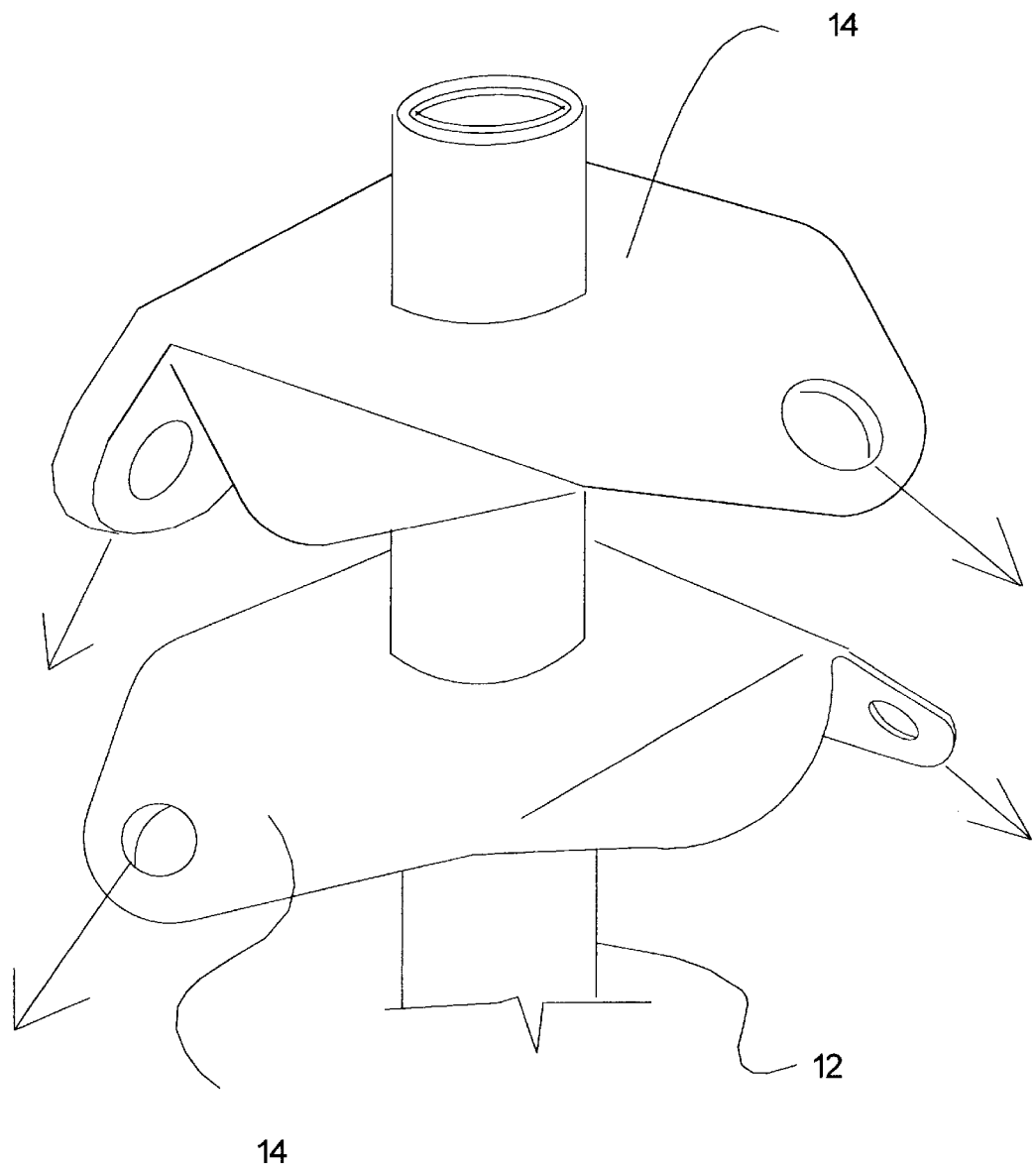
FIG. 5 is a detail of the quad arrangement of the rebar stanchion head.
Figure 6:
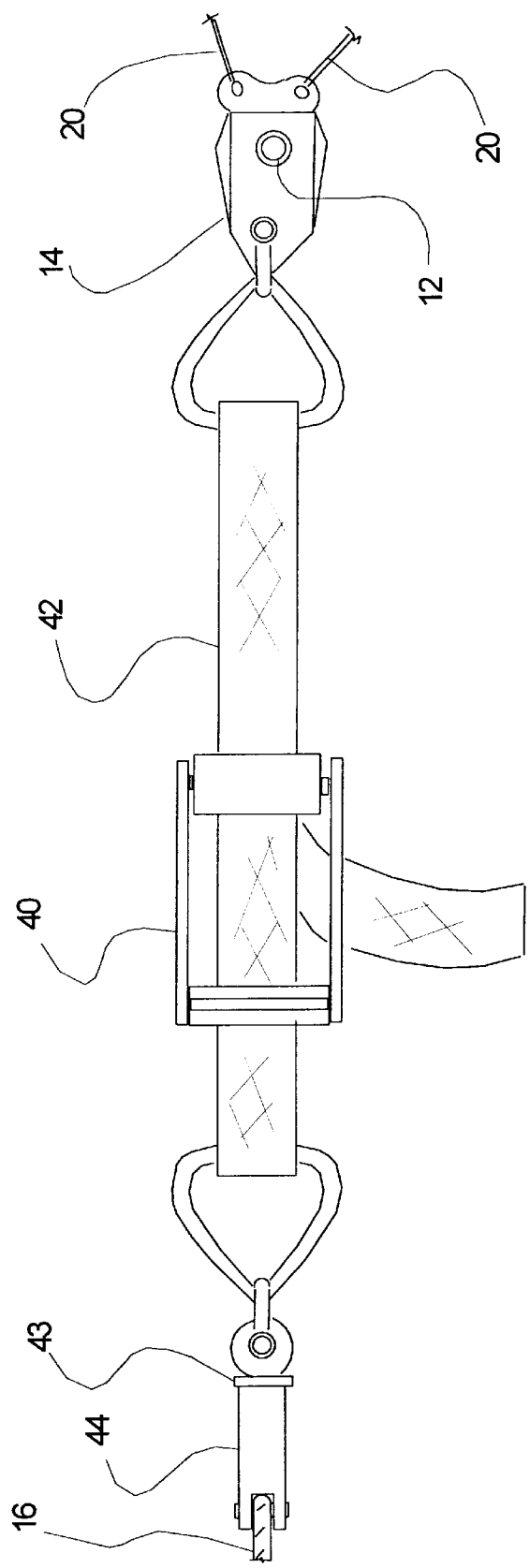
FIG. 6 is a detail of the load binder assembly.

Referring to FIG. 4, the Quad arrangement of the rebar stanchion assembly is shown. In this preferred embodiment four horizontal lifelines can be arranged around a floor opening that is to be decked. In this arrangement each stanchion 12 contains 2 rebar stanchion heads 14, arranged at right angles to each other as shown in FIG. 5. The tie back cable 20 securing these heads 14 tie to different sets of rebar 18. As the horizontal lifeline cables 16 are pretensioned the entire system becomes a rigid structure by pulling on the tie back cables 20 and rebar 18.

Figure 7:
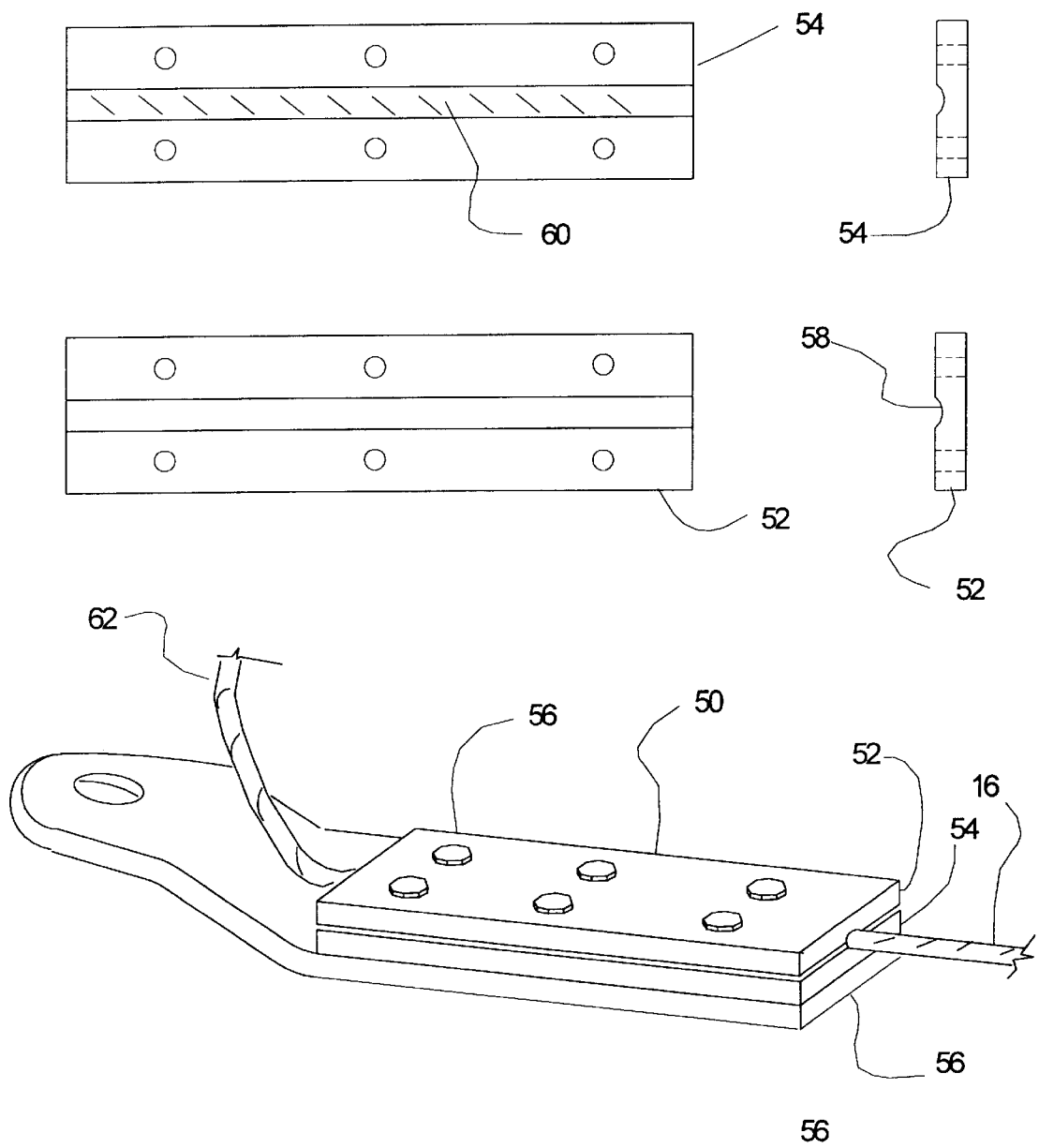
FIG. 7 is a detail of the inline cable clamp.
Figure 8:
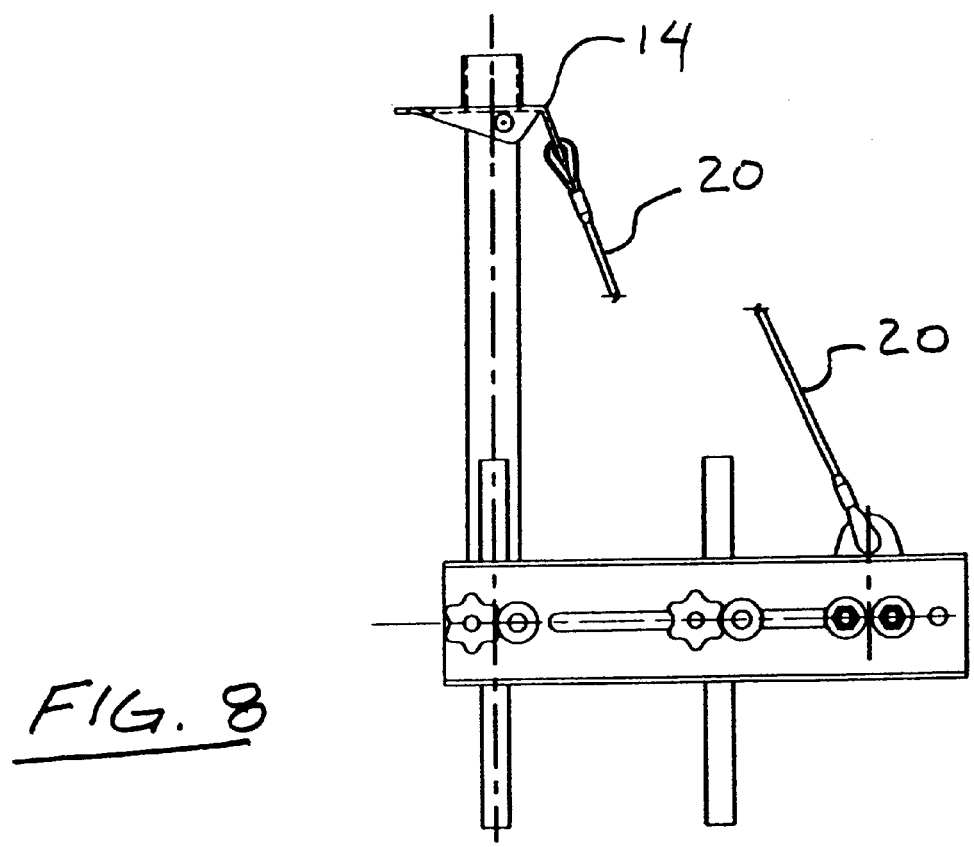
FIG. 8 illustrates the use of adaptor structure to accommodate various structures.
Figure 9:
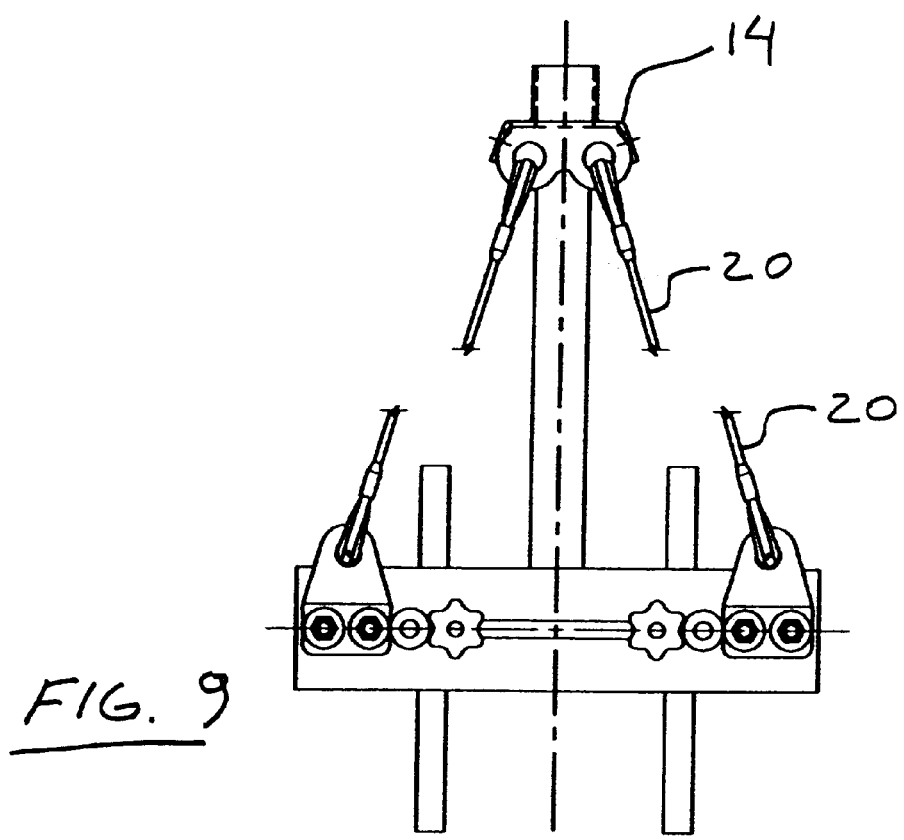
FIG. 9 illustrates the use of the adaptor shown in FIG. 8 to support a pair of guy supports.
Figure 10:
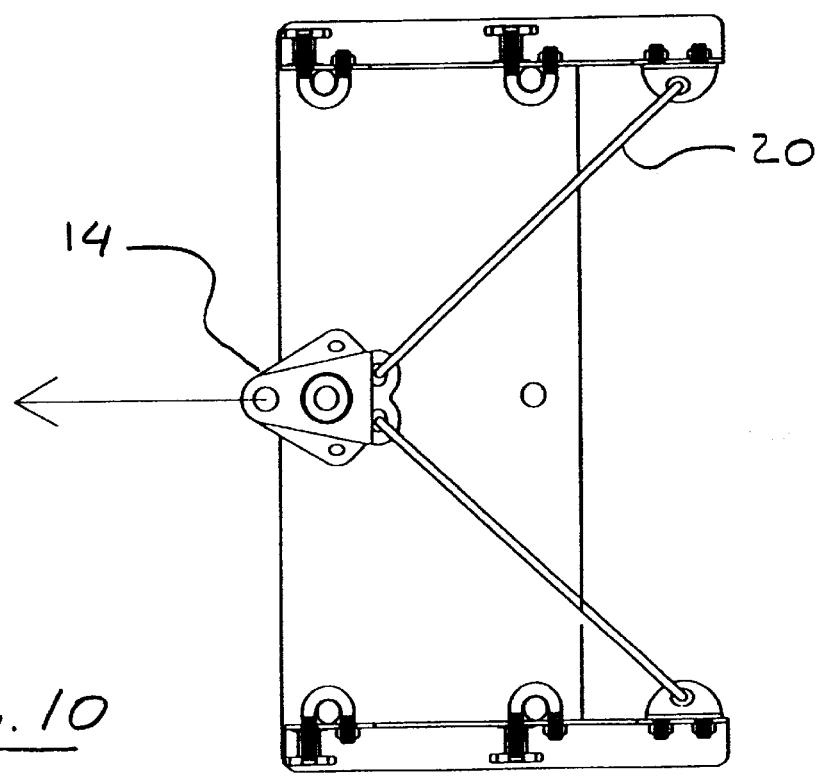
FIG. 10 is a top, plan view of the installation illustrated in FIG. 8.
Figure 11:
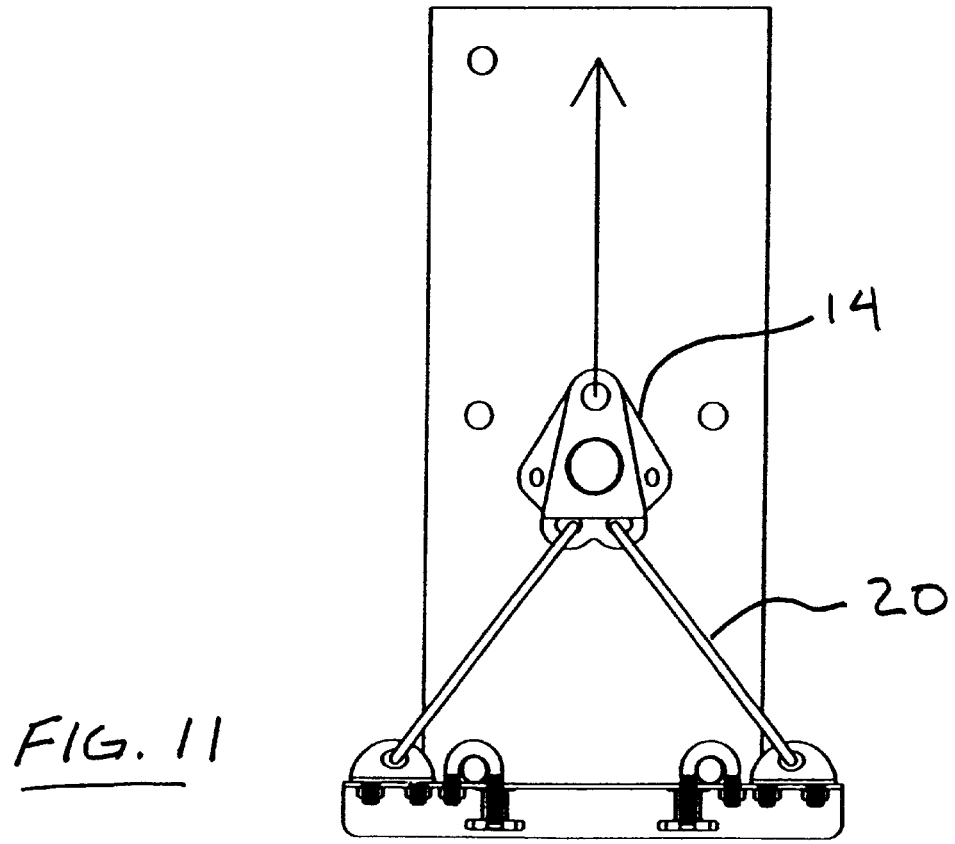
FIG. 11 is a top, plan view of the installation illustrated in FIG. 9.
Figure 12:
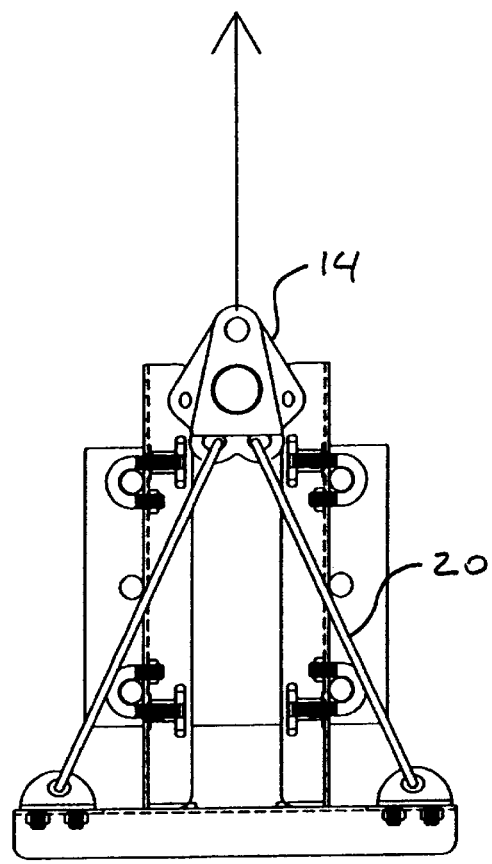
FIG. 12 is a top, plan view of an installation using a frame to further extend the attachment points for the guy supports.
Figure 13:
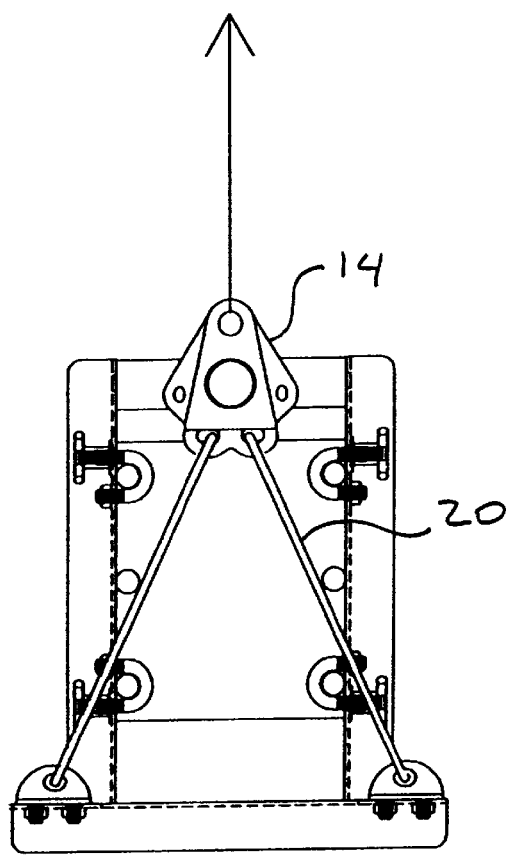
FIG. 13 is a top, plan view of the frame illustrated in FIG. 12 accommodating a wider arrangement of rebar stubs.

Referring again to FIGS. 1 and 6, the take-up and pre-tensioning of the horizontal lifeline cable 16 is accomplished using a sling webbing load binder 40. The load binder uses an anchorage strap 42 to enable up to 10 ft. of take-up with a simple pull rather than the customary method of screw adjustment using 6 inches to 12 inches turnbuckles. Once the excess length is pulled out of the cable with the take up anchorage strap 42 the load binder 40 is ratcheted until the proper horizontal lifeline line pretension is achieved as indicated by the tension indicator 43 in the shock absorber 44. This use of a load binder 40 and anchor strap 42 to provide installation and tensioning of the system greatly reduces the time required for a horizontal lifeline installation. The final component of the system that allows for rapid deployment of the horizontal lifelines is the inline cable clamp 50 as shown in FIG. 7. The preferred embodiment of the inline cable clamp consists of a top plate 52 that has a half round groove 58 cut in it that is equal to the radius of the horizontal lifeline steel cable 16.

The clamp plate 54 also has a half round groove cut into it that also has the lays of the cable machined into it to match the exact helix angle 60 of the cable lays. When the top plate 52 and the clamp plate 54 are matched together around the cable they leave a space 62. When the torque bolts 56 are tightened the cable is compressed between the top plate 52 and the clamp plate 54. The lays of the cable 16 are compressed into the grooves 60 in the clamp plate 54. This enables the cable to be clamped to form an end termination without bending or kinking the cable. The clamp bolts 56 are all torqued to an even load setting to assure uniform load distribution within the inline cable clamp 50. The free end of the cable is then coiled and tied off to keep it from tangling during the work process.

FIGS. 8 through 13 illustrate the use of an adjustor plate 100 that includes a pair of hand operated clamps 102 that attach to the sections of rebar 18 or studs that protrude from the structure 104. The adjustor plates allow extension or broadening of the support base to which the guy members 104 are attached, and thus adjust the angle of the guy members 104 relative to the upper end 106 of the stanchions 12. It is important to note that in the event that an adequately located rebar stub is not found on the surface of the structure, it is contemplated that the disclosed system may be used by simply drilling a hole or holes into the structure and attaching studs into the structure to allow use of the system as described above.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A method for supporting a safety stanchion over a surface having a plurality of rebar sections protruding from the surface, the method comprising:

providing an elongated tubular stanchion, the elongated tubular stanchion being adapted for sliding over the rebar sections protruding from the surface;

providing at least two flexible guy members;

sliding the elongated tubular stanchion over one of the rebar section, so that the rebar section is surrounded by the tubular stanchion;

attaching the guy members to the rebar sections; and attaching the guy members to the to the tubular stanchion, so that the stanchion is supported over the surface, from the rebar sections.

2. A method for creating a horizontal lifeline support system supported from at least one surface having a plurality of rebar sections protruding from the surface, the method comprising:

providing a horizontal lifeline;

providing a plurality of elongated tubular stanchion, the elongated tubular stanchion being adapted for sliding over the rebar sections protruding from the surface;

providing a plurality of flexible guy members;

sliding one of the elongated tubular stanchion over one of the rebar section, so that the rebar section is surrounded by the tubular stanchion;

sliding another of elongated tubular stanchion over one of the rebar section, so that the rebar section is surrounded by the tubular stanchion;

attaching the guy members to the rebar sections; and attaching the guy members to the to the tubular stanchion, so that the stanchion is supported from the rebar sections over the surface; and extending and supporting the lifeline between the elongated tubular stanchions.

* * * * *